(12) United States Patent
Batdorff

(10) Patent No.: US 8,573,620 B2
(45) Date of Patent: Nov. 5, 2013

(54) VEHICLE SUSPENSION SYSTEM

(75) Inventor: Jonathan D. Batdorff, Fort Wayne, IN (US)

(73) Assignee: International Truck Intellectual Property Company, LLC, Lisle, IL (US)

( * ) Notice: Subject to any disclaimer, the term of this patent is extended or adjusted under 35 U.S.C. 154(b) by 0 days.

(21) Appl. No.: 13/581,067

(22) PCT Filed: Mar. 2, 2010

(86) PCT No.: PCT/US2010/025874
§ 371 (c)(1),
(2), (4) Date: Aug. 24, 2012

(87) PCT Pub. No.: WO2011/109011
PCT Pub. Date: Sep. 9, 2011

(65) Prior Publication Data
US 2013/0001914 A1   Jan. 3, 2013

(51) Int. Cl.
*B60G 11/34* (2006.01)

(52) U.S. Cl.
USPC .............................. 280/124.163; 280/124.128

(58) Field of Classification Search
USPC .................... 280/124.163, 124.128
See application file for complete search history.

(56) References Cited

U.S. PATENT DOCUMENTS

| | | | | |
|---|---|---|---|---|
| 3,309,107 A * | 3/1967 | Chieger | ................. | 280/124.108 |
| 3,664,452 A * | 5/1972 | Schaeff | ........................ | 180/349 |
| 4,580,798 A * | 4/1986 | Roelofs | ....................... | 280/5.508 |
| 4,923,210 A * | 5/1990 | Heider et al. | ............... | 280/6.153 |
| 4,946,190 A * | 8/1990 | Buttner | .................. | 280/124.163 |
| 4,966,387 A * | 10/1990 | White, IV | .............. | 280/124.163 |
| 4,993,729 A * | 2/1991 | Payne | .......................... | 280/81.1 |
| 5,058,917 A * | 10/1991 | Richardson | .................. | 280/86.5 |
| 5,615,906 A * | 4/1997 | Raidel, Sr. | .................... | 280/686 |
| 5,938,221 A | 8/1999 | Wilson | | |
| 6,276,710 B1 * | 8/2001 | Sutton | .......................... | 280/678 |
| 6,394,474 B1 * | 5/2002 | Warinner et al. | ...... | 280/124.104 |
| 6,739,608 B2 | 5/2004 | Warinner et al. | | |
| 6,883,810 B2 * | 4/2005 | Svartz et al. | ............... | 280/5.519 |
| 7,195,272 B2 * | 3/2007 | Larson et al. | ................. | 280/680 |
| 2006/0103103 A1 * | 5/2006 | Land et al. | ............. | 280/124.163 |
| 2012/0161413 A1 * | 6/2012 | Subbarayalu et al. | . | 280/124.128 |

* cited by examiner

*Primary Examiner* — Paul N Dickson
*Assistant Examiner* — Nicole Verley
(74) *Attorney, Agent, or Firm* — Jeffrey P. Calfa; Mark C. Bach

(57) ABSTRACT

A suspension system suspends an axle from a vehicle undercarriage. A mounting mounts a trailing arm for pivotal motion about a horizontal axis passing through a proximal end of the trailing arm perpendicular to the direction of vehicle travel while the vehicle is being steered in a straight line. An air spring is disposed between the undercarriage and a distal end of the trailing arm. A fastening holds fast together the middle of a resiliently flexible locating strap, the middle of the trailing arm, and the axle. A front locating bracket and a rear locating bracket fastened to the undercarriage respectively locate the front end of the locating strap horizontally in a direction parallel to the horizontal axis about which the trailing arm pivots and the rear end of the locating strap horizontally in a direction parallel to the horizontal axis about which the trailing arm pivots.

8 Claims, 2 Drawing Sheets

VEHICLE SUSPENSION SYSTEM

FIELD OF THE DISCLOSURE

This disclosure relates to wheeled vehicles, such as truck vehicles, and particularly to a suspension system of such a vehicle.

BACKGROUND OF THE DISCLOSURE

An undercarriage of a truck vehicle typically comprises a suspension system that includes suspension of an axle, such as a rear axle, from an undercarriage component, such as a chassis frame. The suspension system absorbs road-induced impacts as the vehicle travels, contributing to quality of vehicle ride and vehicle handling.

One type of suspension system is a steel spring suspension system. Such a system typically comprises a multi-leaf spring on the right side of the vehicle and a multi-leaf spring on the left side of the vehicle. Front and rear ends of the longest leaf in each spring are mounted on a respective undercarriage component, such as a chassis frame side rail, via respective front and rear spring leaf mounting brackets fastened to the respective undercarriage component. A shackle may be present between one end of the longest leaf and the corresponding mounting bracket. An axle is fastened to the suspension system by fastening a housing of the axle to each multi-leaf spring midway between the respective front and rear mounting brackets.

As the vehicle travels, irregularities in an underlying road surface impart vertical forces to the axle. While those forces are cushioned in part by the suspension system, they are reacted on the undercarriage via the spring leaf mounting brackets.

The nature of the mounting of a steel spring suspension system to an undercarriage can inherently maintain proper alignment of the axle to the undercarriage and to wheels other than those on the axle. Proper alignment of a drive axle to the undercarriage provides straight-line travel that avoids creating a non-zero, or off-center, thrust angle that creates a condition sometimes referred to as "dog tracking", a condition that contributes to steering wheel misalignment because the driver must over- or under-steer to correct for it. Dog tracking can lead to accelerated tire wear.

Another type of suspension system is an air suspension system. Instead of steel spring leaves, an air suspension system has air springs on right and left sides of the axle for absorbing vertical road forces imposed on the axle. An air spring typically has a single point of attachment to an undercarriage, unlike the front-rear mounting of a spring leaf via front and rear spring leaf mounting brackets. Maintenance of proper alignment of the axle to the undercarriage is provided by elements of the suspension system other than the air springs because the air springs cannot do so by themselves.

SUMMARY OF THE DISCLOSURE

A vehicle manufacturing facility may build some vehicles that have steel spring suspension systems and others that have air suspension systems. The diversity between the two suspension systems may not be conducive to commonality of parts.

This disclosure relates to an air spring suspension system that can use certain parts that are identical or similar to those used in a steel spring suspension system. Consequently, manufacturing economies can be realized because a manufacturing facility can stock fewer unique parts, those parts can be manufactured in greater volumes, and certain assembly steps can be common to assembly of both types of suspension systems to an undercarriage.

The disclosed embodiment of air spring suspension system comprises an axle suspended from an undercarriage by a right trailing arm and by a left trailing arm. Each trailing arm has a proximal end and a distal end. Proper alignment of the axle to the undercarriage is maintained by a resiliently flexible right locating strap and a resiliently flexible left locating strap. Each locating strap has a front end, a rear end, and a middle between the front end and the rear end.

A right fastening holds fast together the middle of the right locating strap, a housing of the axle, and the right trailing arm midway between its proximal end and its distal end. The proximal end of the right trailing arm is mounted on the undercarriage in a way that allows the right trailing arm to pivot about a horizontal axis perpendicular to a direction of vehicle travel while the vehicle is being steered in a straight line as up-down motion of the axle acts on the right trailing arm. A right air spring is disposed between the undercarriage and the distal end of the right trailing arm beyond the axle relative to the proximal end of the right trailing arm.

A left fastening holds fast together the middle of the left locating strap, the housing of the axle, and the left trailing arm midway between its proximal end and its distal end. The proximal end of the left trailing arm is mounted on the undercarriage in a way that allows the left trailing arm to pivot about a horizontal axis perpendicular to the direction of vehicle travel while the vehicle is being steered in a straight line as up-down motion of the axle acts on the left trailing arm. A left air spring is disposed between the undercarriage and the distal end of the left trailing arm beyond the axle relative to the proximal end of the left trailing arm.

Each locating strap maintains the horizontal axis about which the proximal end of the respective trailing arm can pivot perpendicular to the direction of vehicle travel while the vehicle is being steered in a straight line, but without any significant cushioning of road-induced force on the undercarriage as would a steel spring suspension. This maintenance of the pivot axis orientation is accomplished by relating the front end and the rear end of each locating strap to a respective front and rear locating bracket in a particular way and using the respective air spring to cushion essentially the entire road-induced force.

Each front bracket comprises side walls defining a throat that is open in a downward direction and in a direction toward the rear bracket. Each rear bracket comprises side walls defining a throat that is open in a downward direction and in a direction toward the front bracket. The side walls of each front bracket constrain the front end of the respective locating strap against any substantial movement in a horizontal direction parallel to the axis about which the proximal end of the respective trailing arm pivots. The side walls of each rear bracket constrain the rear end of the respective locating strap against any substantial movement in a horizontal direction parallel to the axis about which the proximal end of the respective trailing arm pivots.

The present disclosure relates to a vehicle comprising an undercarriage, an axle having a housing, and a suspension system suspending the axle from the undercarriage. The suspension system comprises a trailing arm having a proximal end, a distal end, and a middle between the proximal end and the distal end, a mounting that mounts the trailing arm on the undercarriage for pivotal motion about a horizontal axis that passes through the proximal end of the trailing arm and is perpendicular to the direction of vehicle travel while the vehicle is being steered in a straight line, an air spring disposed between the undercarriage and the distal end of the trailing arm, a resiliently flexible locating strap having a front end, a rear end, and a middle between the front end and the rear end, a fastening that holds fast together the middle of the resiliently flexible locating strap, the middle of the trailing arm, and the axle, a front locating bracket fastened to the undercarriage, a rear locating bracket fastened to the undercarriage rearward of the front locating bracket, the front locating bracket comprising side walls locating the front end of the resiliently flexible locating strap horizontally in a direction parallel to the horizontal axis about which the trailing arm pivots, and the rear locating bracket comprising side walls locating the rear end of the resiliently flexible locating strap horizontally in a direction parallel to the horizontal axis about which the trailing arm pivots.

The foregoing summary, accompanied by further detail of the disclosure, will be presented in the Detailed Description below with reference to the following drawings that are part of this disclosure.

DETAILED DESCRIPTION

Figure 1:
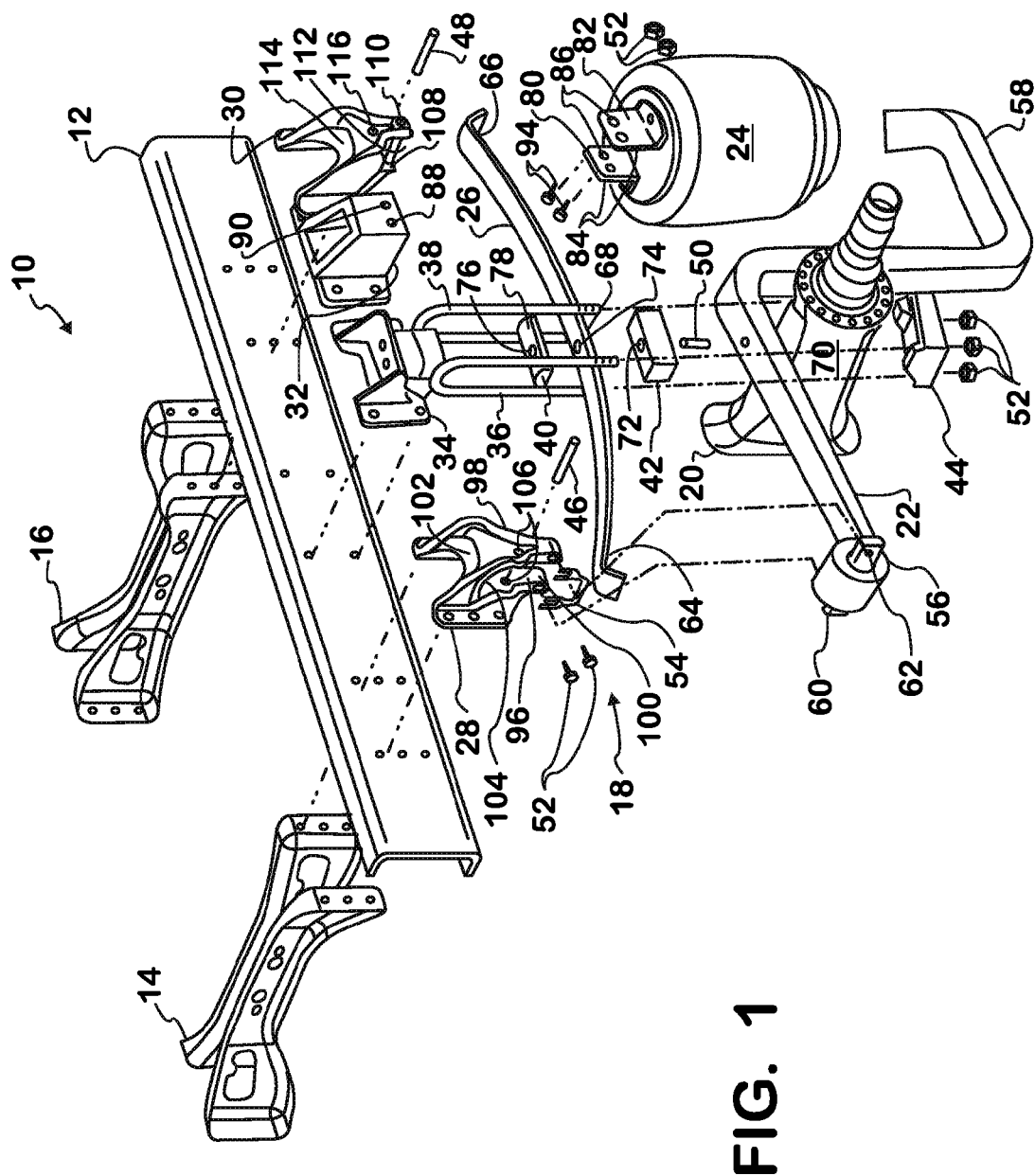
FIG. 1 is an exploded perspective view of a left rear suspension of a vehicle for suspending a rear axle.

FIG. 1 shows a portion of a vehicle undercarriage 10 comprising a left side rail 12 of a chassis frame that further comprises cross members 14, 16 that bridge left side rail 12 to a right side rail (not shown).

The left rear of a suspension system 18 suspends a rear axle 20 from left side rail 12. Left rear suspension system 18 comprises a left trailing arm 22, a left air spring 24, a resiliently flexible left locating strap 26, a left front locating strap bracket 28, a left rear locating strap bracket 30, a left air spring mounting bracket 32, a snubber 34, a front U-bolt 36, a rear U-bolt 38, an upper spacer 40, a lower spacer 42, a saddle 44, a front pin 46, a rear pin 48, a locating pin 50, fasteners 52, and a shim 54. Brackets 28, 30, 32 and a bracket of snubber 34 are disposed against an outer vertical face of left side rail 12 and fastened to that side rail.

Left trailing arm 22 comprises a proximal end 56, a distal end 58, and a middle that is between proximal end 56 and distal end 58. Proximal end 56 contains a bar 60 having a central zone that is received within a bushing disposed within an eye of trailing arm 22. Inner and outer ends of bar 60 protrude from the bushing and contain holes 62 that provide for bar 60 to be fastened by some fasteners 52 to left front locating strap bracket 28.

From proximal end 56, left trailing arm 22 is initially straight, extending toward the rear of undercarriage 10 more horizontally than vertically to a location beyond rear axle 20 where it extends vertically downward to a location where it extends further rearward to distal end 58 where the arm bends inward.

Left locating strap 26 comprises a front end 64, a rear end 66 and a middle 68.

A left fastening that comprises front U-bolt 36, rear U-bolt 38, upper spacer 40, lower spacer 42, saddle 44, locating pin 50, and some fasteners 52 holds fast together middle 68 of left locating strap 26, a portion of the middle of left trailing arm 22 that overlies a housing 70 of rear axle 20, and the portion of housing 70 underlying left trailing arm 22.

Locating pin 50 fits in an upper portion of a hole 72 in lower spacer 42 and passes through a hole 74 in middle 68 of left locating strap 26 to fit in a hole 76 in upper spacer 40. A lower surface of upper spacer 40 is disposed against an upper surface of middle 68 of left locating strap 26, and an upper surface of lower spacer 42 is disposed against a lower surface of middle 68 of left locating strap 26.

Rounded ends of an upper surface of upper spacer 40 are separated by a notch 78 that presents a flat surface toward an elastomeric element of snubber 34. Bights of U-bolts 36, 38 bear against the upper surfaces of the rounded ends of upper spacer 40. Legs of U-bolts 36, 38 straddle the rounded ends of upper spacer 40, middle 68 of left locating strap 26, lower spacer 42, left trailing arm 22, and housing 70 of rear axle 20, and then pass through through-holes in saddle 44. Fasteners 52 are run onto the free ends of the U-bolt legs that protrude through the saddle through-holes and are drawn tight against saddle 44 to cause the U-bolt bights and the saddle to forcefully clamp axle housing 70, left trailing arm 22, lower spacer 42, left locating strap 26, and upper spacer 40 together, thereby holding them fast.

The lower end of left air spring 24 is fastened to distal end 58 of left trailing arm 22. The upper end of left air spring 24 comprises confronting, spaced apart brackets 80, 82 having aligned through-holes 84, 86 that provide for the upper end of left air spring 24 to be fastened to left air spring mounting bracket 32 when bracket 80 is disposed against an inside face of a wall of left air spring mounting bracket containing through-holes 88, 90 that register with through-holes 84, 86 in bracket 80, and bracket 82 is at the same time is disposed against an outside face of the same wall to register its through-holes 84, 86 with through-holes 88, 90. With the aforementioned holes in registration as described, threaded bolts 94 can pass through and protrude from each set of registered holes and some of fasteners 52 can be run onto the free ends of bolts 94 and tightened to secure the three brackets 32, 80, and 82 together.

Left front locating strap bracket 28 comprises side walls 96, 98 defining a throat 100 that is open in a downward direction and in a direction toward left rear locating strap bracket 30. Side walls 96, 98 constrain front end 64 of left locating strap 26 against any substantial movement in a horizontal direction parallel to the axis about which the proximal end of left trailing arm 22 can pivot because the width of front end 64 of left locating strap 26 is chosen to be equal to the width of the opening of throat 100 less a clearance for manufacturing and assembly tolerances.

Left front locating strap bracket 28 further comprises a top wall 102 having a downwardly facing surface 104 that has a convex curvature toward the upper surface of front end 64 of left locating strap 26. Between side walls 96, 98, the upper surface of front 64 of left locating strap 26 has a convex curvature toward surface 104 while the lower surface of front end 64 has a downwardly concave curvature. Front pin 46 is fit to aligned holes 106 in side walls 96, 98 to pass below left locating strap 26 thereby capturing left locating strap 26 in the space between surface 104 and front pin 46.

Left rear locating strap bracket 30 comprises side walls 108, 110 defining a throat 112 that is open in a downward direction and in a direction toward left front locating strap bracket 28. Side walls 108, 110 constrain rear end 66 of left locating strap 26 against any substantial movement in a horizontal direction parallel to the axis about which the proximal end of left trailing arm 22 can pivot because the width of rear end 66 of left locating strap 26 is chosen to be equal to the width of the opening of throat 112 less a clearance for manufacturing and assembly tolerances.

Left rear locating strap bracket 30 further comprises a top wall 114 having a downwardly facing surface that like top wall 102 has a convex curvature toward the upper surface of rear end 66 of left locating strap 26. Between side walls 108, 110, the upper surface of rear end 66 of left locating strap 26 has a convex curvature while the lower surface of rear end 66 has a downwardly concave curvature. Rear pin 48 is fit to aligned holes 116 in side walls 108, 110 to pass below left locating strap 26 thereby capturing left locating strap 26 in the space between the downwardly curved surface of top wall 114 and rear pin 48.

Left locating strap may be designed in relation to other components of suspension system 12 to interact with brackets 64, 66 in different ways.

When undercarriage 10 is hoisted to elevate wheels at the ends of axle 20 from an underlying surface, front end 64 of left locating strap 26 may rest on front pin 46 and rear end 66 may rest on rear pin 48, or front end 64 may occupy throat 100 free of contact with either front pin 46 or top wall 102 and rear end 66 may occupy throat 112 free of contact with either rear pin 48 or top wall 114, or front end 64 may contact surface 104 of top wall 102 and rear end 66 may contact the downwardly facing surface of top wall 114.

Figure 2:
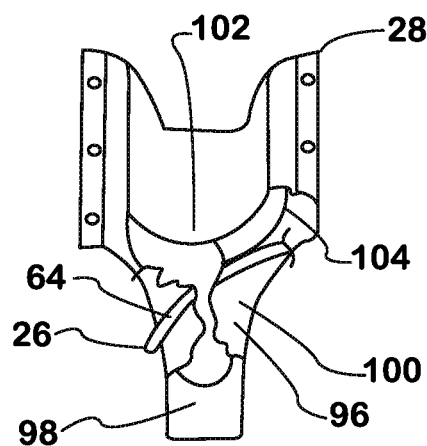
FIG. 2 is a side elevation of a locating strap mounting bracket with a portion of the bracket broken away.
Figure 3:
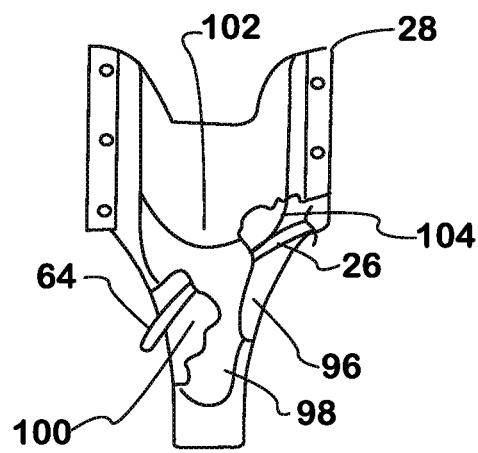
FIG. 3 is another side elevation of the locating strap mounting bracket with a portion of the bracket broken away.

FIG. 2 shows front end 64 contacting surface 104 of top wall 102. In a similar way, rear end 66 contacts the downwardly facing surface of top wall 114. When left locating strap 26 is increasingly flexed by upward displacement of axle 20 toward undercarriage 10, the line of contact of the top surface of front end 64 with surface 104 can change as shown in FIG. 3. The line of contact of the top surface of rear end 66 with the downwardly facing surface of top wall 114 can similarly change.

Extreme upward displacement of the axle is snubbed by notch 78 abutting the elastomeric element of snubber 34.

Shim 54 provides a means for securing proper initial alignment of axle 20 to undercarriage 10 to position bar 60 forwardly in relation to a corresponding bar on a right trailing arm when such forward positioning is necessary to secure proper alignment. Shim 54 is disposed between bar 60 and front edges of sides 96, 98. A shim can be used to forwardly position the bar of the right trailing arm when proper alignment is needed by forward positioning of the right trailing arm.

Although not shown in the drawing, suspension system 18 also has a corresponding right rear suspension suspending the right end of rear axle 20 from a right side rail. Suspension system 18 provides an opportunity for lowering the roll center of the vehicle and decreased vehicle weight.

The foregoing has described a vehicle comprising an undercarriage, an axle having a housing, and a suspension system suspending the axle from the undercarriage.

The suspension system comprises a trailing arm having a proximal end, a distal end, and a middle between the proximal end and the distal end, a mounting that mounts the trailing arm on the undercarriage for pivotal motion about a horizontal axis that passes through the proximal end of the trailing arm and is perpendicular to the direction of vehicle travel while the vehicle is being steered in a straight line, an air spring disposed between the undercarriage and the distal end of the trailing arm, a resiliently flexible locating strap having a front end, a rear end, and a middle between the front end and the rear end, a fastening that holds fast together the middle of the resiliently flexible locating strap, the middle of the trailing arm, and the axle, a front locating bracket fastened to the undercarriage, and a rear locating bracket fastened to the undercarriage rearward of the front locating bracket. The front locating bracket comprises side walls locating the front end of the resiliently flexible locating strap horizontally in a direction parallel to the horizontal axis about which the trailing arm pivots, and the rear locating bracket comprises side walls locating the rear end of the resiliently flexible locating strap horizontally in a direction parallel to the horizontal axis about which the trailing arm pivots.

Also described is a front pin fit to the front locating bracket and vertically underlying the front end of the resiliently flexible locating strap, and a rear pin fit to the rear locating bracket and vertically underlying the rear end of the resiliently flexible locating strap.

The fastening comprises a front U-bolt having legs straddling the middle of the resiliently flexible locating strap, the middle of the trailing arm, and the housing of the axle, a rear U-bolt having legs straddling the middle of the resiliently flexible locating strap, the middle of the trailing arm, and the housing of the axle, a saddle which underlies the housing of the axle and has holes through which the legs of the front U-bolt and the legs of the rear U-bolt pass, and fasteners on the legs of the front U-bolt and the legs of the rear U-bolt.

The fastening further comprises an upper spacer that is disposed between a bight of the front U-bolt and the middle of the resiliently flexible locating strap and between a bight of the rear U-bolt and the middle of the resiliently flexible locating strap, and a lower spacer that is disposed between the middle of the resiliently flexible locating strap and the housing of the axle.

Also described is a snubber disposed for abutment by upper spacer to limit upward displacement of the axle.

The front locating bracket comprises a top wall having a downwardly concave surface confronting the front end of the resiliently flexible locating strap, and the rear locating bracket comprises a top wall having a downwardly concave surface confronting the rear end of the resiliently flexible locating strap.

Also described is an air spring mounting bracket mounting the air spring to the undercarriage, the air spring mounting bracket being fastened to the undercarriage between the front locating bracket and the rear locating bracket.

The mounting of the proximal end of the trailing arm on the undercarriage comprises a bar passing through an eye in the proximal end of the trailing arm and fasteners fastening protruding ends of the bar to the front locating bracket.

Also described is a shim disposed between the bar and the front locating bracket.

What is claimed is:

1. A vehicle comprising:
an undercarriage comprising a chassis frame having a first side rail which is bridged to a second side rail opposite the first side rail by a crossmember;
an axle having a housing;
a suspension system suspending the axle from the undercarriage and comprising a trailing arm having a proximal end through which a horizontal pivot axis, which is perpendicular to the direction of travel of the vehicle while the vehicle is being steered in a straight line, passes, a distal end, and a middle between the proximal end and the distal end, an air spring disposed between the undercarriage and the distal end of the trailing arm, a resiliently flexible locating strap having a front end, a rear end, and a middle between the front end and the rear end, a fastening that holds fast together the middle of the resiliently flexible locating strap, the middle of the trailing arm, and the axle, a front locating bracket disposed against a vertical outer face of, and fastened to, the first side rail, a rear locating bracket disposed against the vertical outer face of, and fastened to, the first side rail rearward of the front locating bracket, the front locating bracket comprising side walls locating the front end of the resiliently flexible locating strap horizontally in a direction parallel to the horizontal pivot axis, and the rear locating bracket comprising side walls locating the rear end of the resiliently flexible locating strap horizontally in a direction parallel to the horizontal pivot axis, a mounting that mounts the trailing arm via the proximal end of the trailing arm on the front locating bracket below the front end of the resiliently flexible locating strap for pivotal motion about the horizontal pivot axis, an air spring mounting bracket disposed against the vertical outer face of, and fastened to, the first side rail between the front locating bracket and the rear locating bracket, the air spring being fastened to the air spring mounting bracket, and in which the front locating bracket comprises a top wall having a downwardly concave surface confronting the front end of the resiliently flexible locating strap, and the rear locating bracket comprises a top wall having a downwardly concave surface confronting the rear end of the resiliently flexible locating strap.

2. The vehicle as set forth in claim 1 further including a front pin fit to the front locating bracket and vertically underlying the front end of the resiliently flexible locating strap, and a rear pin fit to the rear locating bracket and vertically underlying the rear end of the resiliently flexible locating strap.

3. The vehicle as set forth in claim 1 in which the middle of the trailing arm is disposed between the middle of the resiliently flexible locating strap; and the housing of the axle, the distal end of the trailing arm is disposed vertically below the rear end of the resiliently flexible locating strap, and the fastening comprises a front U-bolt having legs straddling the middle of the resiliently flexible locating strap, the middle of the trailing arm, and the housing of the axle, a rear U-bolt having legs straddling the middle of the resiliently flexible locating strap, the middle of the trailing arm, and the housing of the axle, a saddle which underlies the housing of the axle and has holes through which the legs of the front U-bolt and the legs of the rear U-bolt pass, and fasteners on the legs of the front U-bolt and the legs of the rear U-bolt.

4. The vehicle as set forth in claim 3 in which the fastening further comprises an upper spacer that is disposed between a bight of the front U-bolt and the middle of the resiliently flexible locating strap and between a bight of the rear U-bolt and the middle of the resiliently flexible locating strap, and a lower spacer that is disposed between the middle of the resiliently flexible locating strap and the housing of the axle.

5. The vehicle as set forth in claim 4 including a snubber disposed for abutment by the upper spacer to limit upward displacement of the axle.

6. The vehicle as set forth in claim 4 further including a through-hole through the middle of the resiliently flexible locating strap at a location between the front U-bolt and the rear U-bolt, a hole in the lower spacer at a location between the front U-bolt and the rear U-bolt, a hole in the upper spacer at a location between the front U-bolt and the rear U-bolt, and a locating pin which passes through the through-hole in the middle of the resiliently flexible locating strap and fits in the hole in the lower spacer and in the hole in the upper spacer.

7. The vehicle as set forth in claim 1 in which the mounting of the proximal end of the trailing arm on the undercarriage comprises a bar passing through an eye in the proximal end of the trailing arm and fasteners fastening protruding ends of the bar to the front locating bracket.

8. The vehicle as set forth in claim 7 further comprising a shim disposed between the bar and the front locating bracket.

\* \* \* \* \*